Jan. 15, 1963         C. H. COLEMAN ET AL         3,073,553
AUTOMATIC CONTROL SYSTEM FOR DIRIGIBLE CRAFT
Filed Dec. 2, 1959                       2 Sheets-Sheet 2

INVENTORS
CHARLES H. COLEMAN
ROWLAND H. WAGNER
BY
ATTORNEY

United States Patent Office 3,073,553
Patented Jan. 15, 1963

3,073,553
AUTOMATIC CONTROL SYSTEM FOR
DIRIGIBLE CRAFT
Charles H. Coleman, Plainview, and Rowland H. Wagner, Locust Valley, N.Y., assignors to Sperry Rand Corporation, Great Neck, N.Y., a corporation of Delaware
Filed Dec. 2, 1959, Ser. No. 856,797
14 Claims. (Cl. 244—77)

This invention relates to the automatic control of dirigible craft and particularly concerns an automatic pilot for high performance aircraft.

In modern high performance aircraft, it is desirable to stabilize the aircraft about the yaw axis by means of signals obtained from acceleration responsive apparatus. A system of this type which utilizes a pair of accelerometers spaced along the longitudinal axis of the aircraft for purposes of yaw damping is described in U.S. Patent No. 2,808,999, entitled Automatic Flight Control Apparatus, issued to P. J. Chenery on October 8, 1957. Another automatic pilot system for aircraft utilizing signals derived from paired accelerometers is disclosed in U.S. patent application Serial No. 571,813, filed March 15, 1956, in the names of Miller and Jude, entitled Aircraft Automatic Pilots, now U.S. Patent No. 3,007,656, issued November 7, 1961. The transient coordination during turns of aircraft utilizing automatic pilots of the aforementioned type is greatly improved by the present invention particularly during the initial portion of the turn, i.e., turn entry.

The two major factors which influence transient coordination during turn entry are (a) the inherent action of a yaw damper to oppose changes in yaw rate and (b) the action of aileron deflection in causing an adverse yawing moment. In the aforementioned U.S. patent application Serial No. 571,813 these effects are reduced by utilizing a signal from an additional pair of spaced accelerometers responsive to angular accelerations around the roll axis which displaces the rudder by an amount proportional to roll rate. The present invention eliminates the requirement for the additional pair of roll accelerometers by mounting first and second yaw accelerometers in spaced relation along the longitudinal axis of the craft and above and below said axis respectively to be responsive to both yaw and roll angular accelerations. By this arrangement, sufficient roll coupling is introduced in the rudder channel from the yaw accelerometers to produce the desired effect without resorting to a separate pair of roll accelerometers.

In the rudder channel, long term coordination is accomplished in the present invention by taking a portion of the signal applied across the control field of the rudder servomotor, passing it through a low pass filter network and applying it as a feedback signal into the rudder servo system. This reduces the rudder servo system low frequency response which reduces its sensitivity to drift while allowing high gain operation of the system at the aircraft short period frequencies for tight dynamic stabilization. Further, this allows the pilot to manually trim the aircraft through the rudder trim controls to compensate for lateral asymmetries while the automatic pilot rudder channel is engaged.

In known automatic pilot systems a plurality of electronic integrators or follow-up motor-generator sets are necessary to provide integration of the radio and heading signal. In the present invention one yaw follow-up motor-generator computer serves a plurality of functions and also provides for automatic wing leveling by means of a simple clutched synchro arrangement. Any unbalances, synchronization errors or aircraft asymmetry causing deviation of the aircraft from the desired heading are automatically compensated by means of a filtered heading signal from the clutched synchro which is applied to the aileron servo system to maintain a zero rate of turn condition. Prior art systems either were not fully automatic and thus required considerable attention by the human pilot to set the proper signal through the roll trim knob, used a separate motor follow-up integrator or used imperfect electronic integrators which do not have infinite memory. Electronic or mechanical integrators must be high gain, long time constant devices which by their very nature become expensive, complex and prone to failure whereas the use of a clutched synchro is inexpensive, simple and accurately maintains the proper phase of the control signal for accurate servo system operation.

In addition to providing automatic wing leveling the yaw follow-up computer also serves the following functions (a) automatic follow-up on heading when the autopilot is disengaged to avoid engage transients when switching to the autopilot mode of operation, (b) provides signals representative of the dynamic heading to the rudder and aileron servo systems and signals representative of the static heading to the aireron servo system in the standard automatic pilot mode of operation, (c) provides corrections for drift due to wind when flying a VHF omni-range (VOR) radio-defined course, and (d) provides corrections for changes in the automatic pilot system or aircraft aerodynamic symmetry during a radio-defined instrument landing system (ILS) automatic approach.

It is an object of the present invention to provide an automatic pilot system having superior transient coordination during turn entry.

It is an additional object of the present invention to provide an automatic pilot system which minimizes the autopilot drift while permitting the pilot to manually trim the aircraft to compensate for lateral asymmetries when the autopilot is engaged.

It is a further object of the present invention to provide an automatic pilot system having good long term and short term turn coordination stabilization characteristics.

It is another object of the present invention to provide an automatic flight control system having superior stabilization qualities with a minimum of equipment.

It is another object of the present invention to provide an automatic flight control system which automatically corrects for aircraft asymmetry with a minimum of equipment.

These and other features will become more easily discernible by reference to the drawings wherein.

Figure 1:
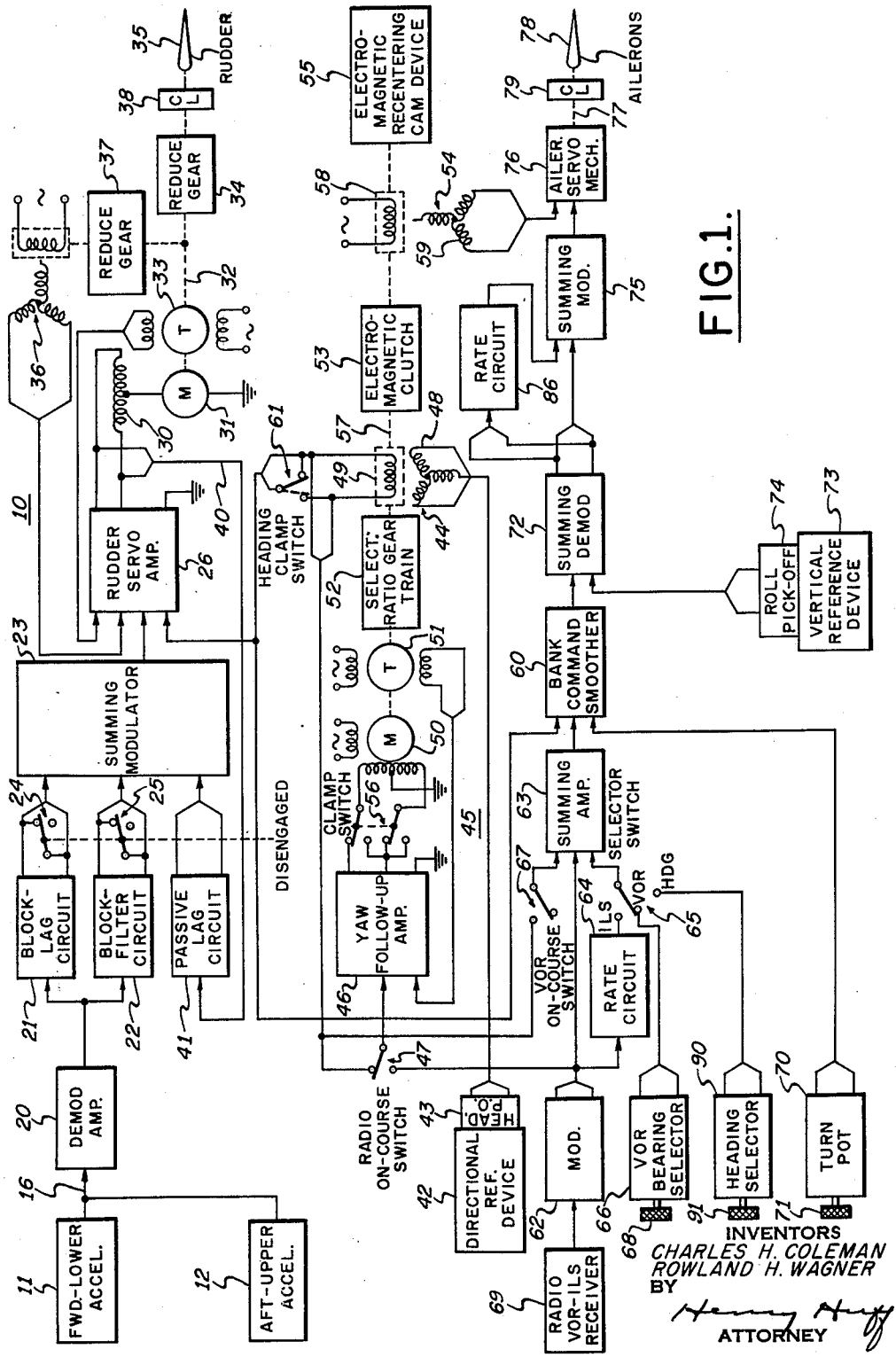
FIG. 1 is a schematic block diagram of the automatic pilot of the present invention.

Referring now to FIG. 1, short term stabilization signals for the rudder servo system, generally indicated at 10, are supplied from a pair of spaced linear accelerometers 11 and 12. The accelerometers 11 and 12 are identical and each comprises an E-type transformer pickoff, the structure of which is disclosed in detail in U.S. Patent No. 2,883,176, issued April 21, 1959, to Alfred Bernstein, entitled Accelerometer. Generally each of the accelerometers 11 and 12 includes a core fixed to the aircraft structure and a weighted armature resiliently mounted on the aircraft structure and cooperative with the core in order that linear accelerations will generate an electrical signal having an amplitude and phase representative of the magnitude and direction of the linear acceleration.

Figure 2:
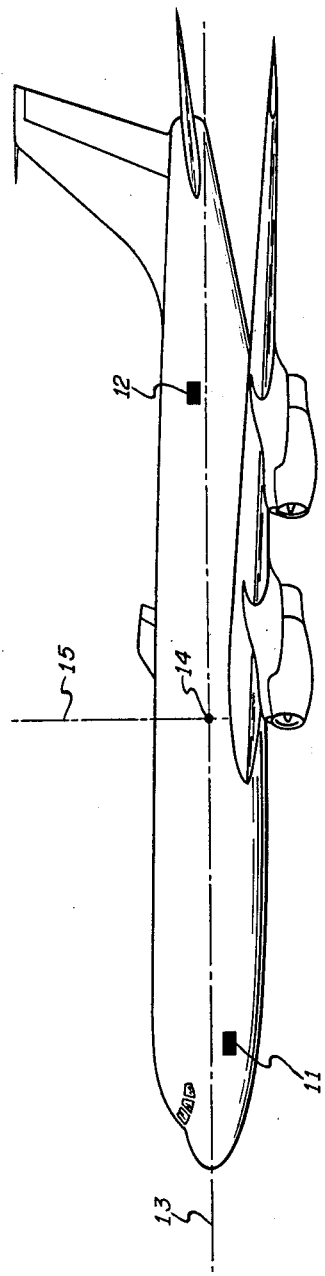
FIG. 2 is a representation of an aircraft showing the location of the accelerometer elements used in the apparatus of FIG. 1.

As shown in FIG. 2, the accelerometers 11 and 12 are preferably mounted in the aircraft along the longitudinal or roll axis 13 and slightly above and below said axis respectively in order that each of the accelerometers is responsive to lateral or athwartship accelerations in a manner to be more fully described. For example, in an aircraft which exhibits slip on turn entry, i.e. adverse yaw characteristics, the forward accelerometer 11 would be mounted forward of the center of gravity 14 of the aircraft and below the axis 13 in the plane containing axis 13 and the normally vertical or yaw axis 15. The aft accelerometer 12 would then be mounted aft of the center of gravity 14 and above axis 13 in the plane containing the axes 13 and 15. By mounting the accelerometers 11 and 12 as described, each of the accelerometers is responsive to the lateral linear acceleration of the aircraft in yaw and roll, i.e., around the vertical axis 15 and the longitudinal axis 13 respectively.

For an aircraft that exhibits skid on turn entry, the forward accelerometer 11 would be mounted above the axis 13 and the aft accelerometer 12 would be mounted below the axis 13, both in the plane containing the axes 13 and 15. The distance which the accelerometers are spaced along the longitudinal axis 13 and above and below the axis 13 depends upon the characteristics of the particular aircraft. The vertical separation of the accelerometers is a function of the turn entry and turn exit coordination requirement and the "Dutch roll" damping requirement. "Dutch roll" is the term applied to sinusoidal motions of the lateral axis of the aircraft caused primarily by the configuration of modern swept wing aircraft.

The accelerometers 11 and 12 are differentially interconnected electrically in order that the lateral linear acceleration signals produced by each accelerometer in response to yaw and roll accelerations of the aircraft combine to produce an output signal on lead 16 proportional to the combined angular yaw and roll accelerations but upon a lateral acceleration of the craft they will produce no electrical output since the signals produced in each of the accelerometers will cancel. This differential electrical interconnection of the accelerometers 11 and 12 is described in detail in the aforementioned patent application Serial No. 571,813.

The angular acceleration signal on lead 16 is demodulated and amplified in a demodulator amplifier 20 and then applied to the input terminals of a block and lag circuit 21 and a block and filter circuit 22. The circuit 21 serves primarily as an integrator having a relatively long time constant and provides an output signal having a phase that is lagging with respect to the phase of its input acceleration signal. By proper adjustment of the lag of the circuit 21 the output thereof is a signal proportional to angular velocity in the frequency range of interest i.e. representative of the combined rate of yaw and roll. A conventional R.C. filter circuit of the integrating type is suitable for this purpose. The circuit 22 is primarily a filter circuit for filtering noise above the control frequency range and its output is an acceleration signal used primarily to provide additional phase lead to compensate for lags introduced by the autopilot servo system or control surface actuator. The circuit 22 may also be an R.C. circuit of the integrating type having a time constant that is one tenth of the circuit 21. Circuits 21 and 22 also contain blocking networks of the R.C. type to minimize any unbalance of the demodulator amplifier 20 or unbalance of the accelerometers 11 and 12 due to mounting misalignment.

The outputs of the circuits 21 and 22 are applied to input terminals of a summing modulator 23. The outputs of the circuits 21 and 22 may be short circuited by means of the ganged switches 24 and 25. The output of the summing modulator 23 is connected to an input terminal of a high gain rudder servo amplifier 26. The output of the amplifier 26 is connected to the control field 30 of a rudder servomotor 31. The output shaft 32 of the rudder servomotor 31 is connected to drive a tachometer generator 33. The tachometer generator 33 provides a rate feedback signal to an input terminal of the amplifier 26 for stabilization purposes. The output shaft 32 of the servomotor 31 is also connected through reduction gearing 34 and a clutch 38 to position a rudder 35. A position feedback signal representative of the position of the rudder 35 is applied to an input terminal of the amplifier 26 by means of a feedback synchro 36 which has its rotor connected through reduction gearing 37 to the output shaft 32.

To provide a signal that simulates a long term stabilization reference signal, the servomotor armature voltage applied to the control field 30 of the servomotor 31 is connected by means of a lead 40 to a passive lag circuit 41. The circuit 41 is a low pass filter circuit and may be an R.C. circuit of the integrating type having a relatively long time constant. The output of the circuit 41 is connected as a feedback signal to an input terminal of the summing modulator 23. The output of circuit 41 is representative of the time integral of the servomotor control field voltage and simulates rudder torque feedback in a manner to be explained.

A directional reference device 42 provides from its heading pick-off 43 a signal representative of the magnetic heading of the aircraft. The directional reference device 42 may be a gyromagnetic compass system of the type described in the aforementioned application Serial No. 571,813. The magnetic heading signal from the pick-off 43 is applied to the stator 48 of a heading synchro 44. The heading synchro 44 forms part of a yaw follow-up computer 45. The rotor 49 of the synchro 44 is connected to provide an input signal to the yaw follow-up amplifier 46 of the computer 45 when the radio on-course switch 47 is in its upper position as shown. The yaw follow-up computer 45 includes the amplifier 46, a servomotor 50, a tachometer generator 51, a selectable-ratio gear train 52, the heading synchro 44, an electromagnetic clutch 53, a follow-up synchro 54 and an electromagnetic recentering cam device 55. The output of the amplifier 46 is connected to the control field of the servomotor 50 when a clamp switch 56 is in its upper position as shown. The output shaft 57 of the servomotor 50 is connected to drive the generator 51 which in turn provides a rate feedback signal to an input terminal of the amplifier 46 for stabilization purposes. The output shaft 57 is also connected through the gear train 52 to the rotor 49 of the synchro 44 and thence through clutch 53 to the rotor 58 of the synchro 54. The heading signal from the rotor 49 is also connected to an input terminal of the rudder servo amplifier 26 and to an input terminal of a bank command smoother 60 when a heading clamp switch 61 is to the left and closed as shown in dotted lines.

The output shaft 57 of the servomotor 50 drives the rotor 58 of the follow-up synchro 54 only when the clutch 53 is energized in a manner to be explained. The rotor 58 of the synchro 54 is energized from a reference source of alternating potential in order to provide an output signal from the stator 59 thereof representative of the position of the shaft 57 in a manner to be explained. The recentering cam device 55 is connected to automatically recenter the rotor 58 under circumstances to be explained.

Figure 3:
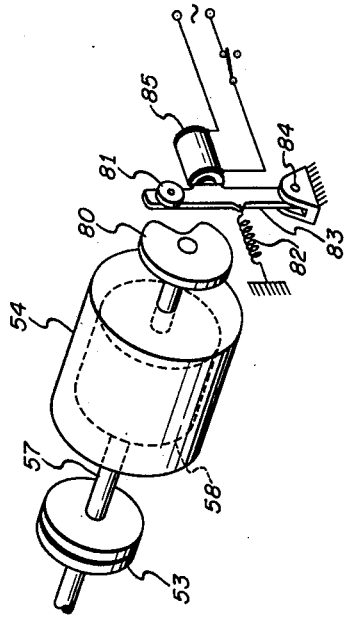
FIG. 3 is a schematic diagram of the electromagnetic recentering cam of FIG. 1.

Referring to FIG. 3, the cam device 55 includes a V-shaped cam 80 connected to the rotor 58 of the synchro 54 and a spring loaded cam follower 81 that cooperates with the V to re-center the rotor 58 when the automatic pilot is disengaged. Spring 82 is connected to a lever 83 upon which the cam follower 81 is mounted to provide a force that tends to rotate the lever 83 counterclockwise as shown around point 84. Spring 82 applies a force through the cam follower 81 to the V-shaped cam 80 which causes the cam 80 to rotate until the cam follower 81 is in the apex of the V thereby centering the rotor 58. When the autopilot is engaged, a solenoid 85 applies a force in a direction to overcome the action of the spring 82, thereby positioning the cam follower 81 away from the cam 80 to permit freedom of movement of the rotor 58 in a manner to be more fully explained.

When the aircraft is being commanded by the automatic pilot to fly a preselected course as defined by a ground-based radio transmitter, radio signals from the transmitter are received by a VOR–ILS radio receiver 69. The output from the radio receiver 69 is a D.C. signal having a magnitude and polarity representative of the amount and direction of the lateral deviation of the aircraft from the desired radio-defined course. The radio displacement signals are applied to a modulator 62 which has its output connected to an input terminal of a summing amplifier 63. When the radio on-course switch 47 is in its downward position, the output of the modulator 62 is also applied to the input terminal of the yaw follow-up amplifier 46. The output of the modulator 62 is also applied to a rate circuit 64 which in turn has its output, when a selector switch 65 is in its upward position, connected to another input terminal of the summing amplifier 63.

When the switch 65 is in its intermediate position as shown, a VOR bearing selector 66 having an adjusting knob 68 is connected to an input terminal of the summing amplifier 63. When the switch 65 is in its downward position, a heading selector 90 having an adjusting knob 91 is connected to an input terminal of the amplifier 63. With a VOR on-course switch 67 in its upward position, the output of the rotor 49 of the heading synchro 44 is connected to another input terminal of the summing amplifier 63. The output of the summing amplifier 63 is connected to an input terminal of the bank smoother 60. The bank smoother 60 is an integrating circuit of the R.C. type or motor-generator type. The bank smoother 60 may also include a limiting circuit to prevent the aircraft from exceeding a predetermined bank angle, for example, 30 degrees.

The primary function of the bank smoother 60 is to smooth the turn command signals which are provided from a turn potentiometer 70 in accordance with the manipulation of a turn knob 71. The potentiometer 70 provides a signal having an amplitude and phase representative of the magnitude and direction of the desired bank angle. The output of the smoother 60 is applied to an input terminal of a summing demodulator 72.

A vertical reference device 73 which may, for example, be a vertical gyroscope provides a signal from its roll pick-off 74 having an amplitude and phase representative of the magnitude and direction of the bank angle of the aircraft. This roll attitude signal is applied to an input terminal of the demodulator 72. The output of the demodulator 72 is applied directly to an input terminal of a summing modulator 75 and through a rate circuit 86 to another input terminal of the modulator 75. The output of the modulator 75 is connected to an input terminal of an aileron servomechanism 76 which has its other input terminal connected to receive the filtered heading signal from the stator 59 of the follow-up synchro 54. The aileron servomechanism 76 is connected by its output shaft 77 through a clutch 79 to position the ailerons 78. The aileron servomechanism 76 may be similar to the rudder servomechanism described in detail above.

The automatic pilot of the present invention may be operated in any one of several modes of operation. In the disengaged mode, switches 24 and 25 are in their upward position as shown effectively short circuiting the signal from the accelerometers 11 and 12. The clutch 38 is disengaged and any drift in the rudder channel of the automatic pilot causing an output from the rudder servo amplifier 26 drives the synchro 36 through the motor 31 and reduction gear 30 thereby nulling the rudder servo system. With the heading clamp switch 61 in its rightward position short circuiting the output from the rotor 49 of synchro 44 and the switch 47 in its upward position, the yaw follow-up computer 45 is in fast follow-up with the clutch 53 deenergized. The clutch 79 is also disengaged.

In the automatic pilot mode of operation with the aircraft controlled automatically by means of the present invention, the switches 24 and 25 are in their downward position. The clutches 38 and 79 are engaged in this and all succeeding modes of operation. The radio on-course switch 47 is in its upward position as shown. The clutch 53 is energized thereby connecting the shaft 57 to the rotor 58. The clamp switch 56 is in its upward position as shown for this and all succeeding modes of operation except when over the zone of confusion in a manner to be explained. The heading clamp switch 61 is to the left as shown in dotted lines and switch 67 is in its downward position as shown. It is assumed that we are not flying a radio defined course and the radio receiver 69 is not turned on. Due to the follow-up operation during the disengage mode, there will be no transient engage errors causing an abrupt movement of the aircraft when switching to the automatic mode. In the engage mode, the aircraft is controlled to fly primarily a selected heading in accordance with the magnetic heading signal from the directional reference 42 or the selected heading signal from the heading selector 80 when the switch 65 is in its downward position.

Gusts or other disturbances which cause the aircraft to yaw about its vertical axis 15 will be sensed by the accelerometers 11 and 12 while signals due to lateral accelerations of the aircraft will oppose each other and cancel. Yaw damping signals are obtained by amplifying, demodulating, lagging and remodulating the yaw angular acceleration signals from the accelerometers 11 and 12 in circuits 20, 21 and 23 respectively. The result is to provide a signal representative of yaw rate to the amplifier 26 which is essentially in phase with the yaw rate at the aircraft Dutch roll frequencies. The amplified output of the amplifier 26 is applied to the servomotor 31 which drives the rudder 35 in a direction to reduce the yaw rate to zero.

The servomotor control field voltage from the output of the amplifier 26 which is integrated in the lag circuit 41 and applied as a feedback signal to modulator 33 reduces miscoordination due to autopilot drift by reducing the response of the rudder servo system 10 at low frequencies. Although the filter circuit 41 reduces low frequency response, it permits high gain operation of the rudder servo system 10 at the aircraft short period frequencies for tight stabilization control. The output signal from the amplifier 26 is proportional to the torque applied to position the rudder 35 and consequently may be considered a torque feedback signal. Utilizing a torque feedback signal of this type achieves inherent parameter control over varying air speed and altitude operation conditions of the aircraft. Further, the use of torque feedback signals establishes a long period reference for long period stabilization of the rudder channel and for turn coordination. The result is that in the steady state, the rudder servomotor 31 exerts no output torque and the rudder 35 will assume a streamline position. This feature of rudder torque feedback also makes possible manual rudder trimming with the automatic pilot engaged. In response to a pilot insertion of manual trim, the rudder servomotor 31 will initially build up a force to maintain a rudder position. This force necessitates development of a servo control field voltage which is fed back through the lag circuit 41 permitting the rudder 35 to move to the trimmed position smoothly. The magnitude of the lag in the lag circuit 41 is selected to be long enough to permit passage of the yaw acceleration and dynamic heading signals to the rudder without distortion.

The aforementioned coordination may be considered static coordination since the aircraft is being controlled to a fixed heading. When the aircraft is being controlled to a changing heading, i.e., by commanding a bank angle, the problem becomes one of dynamic or transient coordination.

The two major factors which cause poor transient coordination particularly during turn entry are (a) the inherent action of a conventional yaw damper to oppose changes in yaw rate and (b) the action of aileron deflection in causing an adverse yawing moment. Both of these effects may be minimized by deflecting the rudder by an amount proportional to the rate of roll of the aircraft. This is accomplished in the present invention by mounting one of the accelerometers above the longitudinal axis 13 of the aircraft and the other below the axis 13 as shown in FIG. 2 in order to provide a signal representative of the combined yaw and roll acceleration. The circuit 21 integrates the portion of the signal representative of the roll acceleration to provide a signal at the input of the summing modulator 23 proportional to the roll rate which is applied to the rudder 35 in a direction to produce smooth turn entry with a minimum of yaw damper opposition and adverse yaw.

Rapid changes in the heading of the aircraft are sensed by the directional reference 42 and applied through the heading synchro 44 to the rudder servo amplifier 26, to the bank smoother 60, and to the input of the yaw follow-up amplifier 46. The amplified heading signal from the yaw follow-up amplifier 46 drives the servomotor 50 in a direction to zero the output from the rotor 49 of the synchro 44.

The speed regulation effect of the feedback signal from the tachometer generator 51 is such that rapid changes in heading are filtered and do not initially appear at the output shaft 57 but do appear as an electrical output of the rotor 49. For the autopilot engaged mode of operation, the time constant of the yaw follow-up computer 45 is approximately 2.5 seconds. In this mode, the time constant of the yaw follow-up computer is such that heading variations at frequencies above a predetermined value, for example, above one-fifteenth cycle per second, are not attenuated and produce a heading error signal at the output of the rotor 49 which may be considered a "dynamic" heading signal. This dynamic heading from the rotor 49 is initially proportional to aircraft heading error but decreases to null as the computer follow-up action takes place. The position of the output shaft 57 is a measure of aircraft heading in a steady state condition.

Upon entering into this mode of operation, the clutch 53 is energized thereby connecting the shaft 57 to the rotor 58 of the synchro 54 and the rotor 58 is simultaneously uncaged. Since the rotor 58 has a fixed excitation, the output signal from the stator 59 changes only as a function of the position of the shaft 57. Whereas heading variations at frequencies below one-fifteenth cycle per second will produce a proportional signal at the output of synchro 54, variations at higher frequencies will be attenuated. Thus the synchro 54 produces a "filtered" heading signal.

Upon engagement of the clutch 53, any subsequent change in aircraft heading produces a signal proportional to the filtered magnetic heading of the aircraft from the synchro 54 which is applied to the aileron servomechanism 76 to produce a bank angle proportional to the heading error. The difference between the filtered heading signal and the actual heading signal is the output of the heading synchro 44 and to avoid any compromise in dynamic heading performance due to excessive filtering, the output of the heading synchro 44 is applied to the bank smoother 60 for roll control and directly to the rudder servo amplifier 26 for tight dynamic control of heading. The heading error signal applied to the amplifier 26 from the directional reference 42 by means of the rotor 49 provides an added degree of stability which allows the use of a high aileron heading signal gradient.

This arrangement also provides automatic wing leveling. Any unbalances, synchronization errors or asymmetry in aerodynamic performance, thrust or construction of the aircraft or engaging the automatic pilot when the wings are not precisely level results in a small heading standoff error. This heading standoff error is sensed by the directional reference 42 and applied to the yaw follow-up computer 45 to provide a signal from the synchro 54 to maintain a zero rate of turn condition. This is a considerable improvement over the prior art systems which are not fully automatic and require considerable attention by the human pilot to set in the proper signal through the roll trim knob or use imperfect electronic integrators which do not have infinite memory.

When a turn is commanded by rotation of the turn knob 71, as the knob 71 is rotated out of its detent position, the clutch 53 is deenergized by means of a conventional interlock arrangement not shown. This declutches the rotor 58 but since the solenoid 85 (shown in FIG. 3) is still energized, the rotor 58 maintains its position thus storing a signal representative of aircraft asymmetry. Upon turn exit when the turn knob 71 is returned to its detent position, the clutch 53 is again energized and engages the rotor 58 to lock the aircraft on its new heading with asymmetries automatically corrected by the stored signal from the synchro 54.

For rapid synchronization during disengagement and during turns, the time constant of the yaw follow-up computer 45 is reduced to about .25 second to minimize the output of the heading synchro 44 and make the output shaft 57 more closely follow the heading of the aircraft. The time constant is reduced by shifting the selectable ratio gear train 52 to a low gear ratio and decreasing the gain of the feedback signal from the tachometer generator 51 by conventional means not shown.

When operated in the VHF omni-range (VOR) radio-controlled mode of operation, the switch 65 is in its intermediate position. The pilot tunes his radio receiver 69 to the desired VOR transmitter and selects the bearing of the desired radial by adjusting the knob 68 of the VOR bearing selector 66. With the automatic pilot engaged, the human pilot maneuvers the aircraft to the desired intercept angle, using either the turn knob 71 or the heading selector 80. As the aircraft comes into the on-course limits of the VOR radio beam signals, conventional sensing and interlocking relay circuitry not shown performs the following switching: switch 47 is placed in the down condition, switch 61 is placed in the rightward condition, switch 65 is in the intermediate position as shown, switch 67 is in the upward condition and clutch 53 is deenergized. In this mode of operation the yaw follow-up computer 45 provides integration of the radio beam signals from the radio receiver 61 to correct for crosswind effects.

Prior art systems use the sum of radio deviation and deviation from the selected heading radio to control the ailerons in this mode. In the presence of crosswind, the aircraft must fly an offset heading to maintain the proper ground track, i.e., must fly at a crab angle. To prevent standoff from the beam some means of correcting or washing out the selected heading must be provided. This is accomplished in the present invention by driving the servomotor 50 with a signal representative of the beam error signal and bucking the output of the heading synchro 44 against the output of the omni-bearing selector 66 thereby assuring zero beam standoff. In this mode of operation, the servomotor 50 is responsive to the beam deviation signal and positions the rotor of synchro 44 accordingly while the stator of synchro 44 is responsive to the heading error signal. The present invention thus provides double the normal heading sensitivity, i.e. heading error plus radio beam error into the amplifier 63.

Upon reaching the zone of confusion over the VOR transmitter, a conventional sensor not shown which is responsive to erratic beam rate signals operates when the beam rate becomes excessive to remove the beam deviation signals from the autopilot by moving switch 56 to its downward position thereby clamping the follow-up computer 45 by short circuiting the output of the yaw follow-up amplifier 46 until the zone of confusion is passed. The aircraft is commanded to fly the drift-corrected heading over the zone of confusion. During VOR operation, the rotor 58 is declutched from the shaft 57 but with the solenoid 85 remaining energized, the rotor 58 is not recentered and thus stores the signal representing system unbalance.

In an ILS mode of radio-controlled operation, beam rates from the rate circuit 64 are utilized in lieu of the heading signals. Therefore, there is no requirement for correction of the basic information to compensate for cross winds as in VOR operation. Thus, in an ILS mode of operation switch 47 is in its downward condition, switch 61 is to the right, switch 65 is in its upward position and switch 67 is in its downward condition. In this mode of operation, changes in aircraft configuration caused by dropping the landing gear, extending the flaps, or changing the power setting of the engine may change the aircraft aerodynamic symmetry. To compensate for this, the clutch 53 is energized to connect the shaft 57 to the rotor 58 in order to provide from the output of the synchro 54 a signal representative of the time integral of the radio beam error signal.

From the foregoing description it will be appreciated that the yaw follow-up computer performs the following functions: (1) fast synchronization on heading when the autopilot is disengaged, (2) dynamic heading to the rudder and aileron channels and static heading to the aileron channel in the standard autopilot mode, (3) automatic wing leveling to correct for system or aerodynamic asymmetries, (4) wind drift corrections when flying VOR, and (5) corrections for changes in system or aerodynamic asymmetries during an automatic approach on ILS.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an automatic pilot for aircraft having positionable aileron control surfaces for maneuvering said craft about its roll axis, roll reference means for providing a signal representative of the roll attitude of said craft, directional reference means for providing a signal representative of the heading of said craft, a first synchro having a first stator responsive to said heading signal and a first rotor, follow-up means responsive to the output of said first rotor including a motor-generator set having an output shaft connected to rotate said first rotor, a second synchro having a second rotor connected to be rotated by said output shaft and a second stator for providing an output in accordance with a filtered version of said heading signal, and aileron servo means responsive to said signals and connected to control said ailerons in accordance with the algebraic summation thereof.

2. A combination as claimed in claim 1 including a rudder, and rudder servo means responsive to the output of said first rotor for controlling said rudder in accordance therewith.

3. A combination as claimed in claim 1 including turn command means for providing a signal in accordance with a desired roll angle, and clutch means responsive to the operation of said turn command means for disengaging said second rotor when a turn is commanded whereby the position of said second rotor remains fixed thereby storing a signal representative of aircraft asymmetry.

4. In an automatic pilot for aircraft having a rudder and ailerons for maneuvering said craft about its yaw and roll axes respectively, directional reference means for providing a signal representative of the heading of said craft, yaw follow-up means responsive to said heading signal for providing a signal representative of a filtered version of said heading signal, integrating means responsive to said heading signal for providing a signal representative of a smoothed version of said heading signal, rudder servo means responsive to said heading signal and connected to position said rudder in accordance therewith, and aileron servo means responsive to said filtered and smoothed heading signals and connected to position said ailerons in accordance with the algebraic summation thereof.

5. A combination as claimed in claim 4 including roll reference means for providing a signal representative of the roll attitude of said craft wherein said aileron servo means is also responsive to said roll signal and positions said ailerons in accordance with the algebraic summation of said roll, filtered heading and smoothed heading signals.

6. In an automatic pilot for aircraft having aileron control surfaces for maneuvering said craft about its roll axis, means including radio receiving means for providing a signal representative of the displacement of said craft from a radio-defined course, directional reference means for providing a signal representative of the heading of said craft, a first synchro having a first stator responsive to said heading signal and a first rotor, follow-up means responsive to the output of said first rotor including a motor-generator set having an output shaft connected to rotate said first rotor, a second synchro having a second rotor connected to be rotated by said output shaft and a second stator for providing an output in accordance with a filtered version of said heading signal, and aileron servo means responsive to said signals and connected to control said ailerons in accordance with the algebraic summation thereof.

7. A combination as claimed in claim 6 including roll reference means for providing a signal representative of the roll attitude of said craft wherein said servo means is also responsive to said roll signal and positions said ailerons in accordance with the algebraic summation of all the aforementioned signals.

8. In an automatic pilot for dirigible craft having a rudder, first and second acceleration sensing means mounted in said craft and adapted to be displaced in proportion to craft accelerations in yaw and roll for providing a signal proportional to the combined angular accelerations of the craft in yaw and roll, integrating means responsive to said signal for providing a signal representative of the integral thereof, and servo means responsive to said integral signal for controlling the rudder in accordance therewith.

9. In an automatic pilot for dirigible craft having a rudder, first and second acceleration responsive means mounted in spaced relation with respect to each other within said craft to be responsive to angular accelerations of said craft in yaw and roll, said first and second acceleration responsive means being spaced along said longitudinal axis and spaced above and below said axis, means responsive to said acceleration responsive means for providing a signal representative of the combined angular accelerations of the craft in yaw and roll, integrating means responsive to said signal for providing a signal representative of the integral thereof, and servo means responsive to said integral signal for controlling said rudder in accordance therewith.

10. In an automatic pilot for dirigible craft having a rudder, first accelerometer means, second accelerometer means, said first and second accelerometer means being mounted in spaced relation along the longitudinal axis of said craft and above and below said axis respectively to be responsive to accelerations of the craft about its yaw and roll axes, said first and second accelerometer means being differentially connected to provide signals having an amplitude and phase representative of the magnitude and sense of the combined yaw and roll angular accelerations of the craft, integrating means responsive to said signal for providing a signal representative of the time integral thereof, and servo means responsive to said integral signal for controlling said rudder in accordance therewith.

11. In an automatic pilot for aircraft having ailerons for maneuvering said craft about its roll axis, a yaw follow-up computer including an amplifier, a servomotor, a tachometer generator, a gear train, a first synchro having a first stator and a first rotor for providing an output from said rotor, a clutch, a second synchro having a second rotor energized from a reference source of alternating potential and a second stator for providing an output, said servomotor being responsive to the output of said amplifier and having its output shaft connected to drive said generator, the output of said generator being connected to provide a rate feedback signal to said amplifier, said first rotor being driven by said output shaft through said gear train, said second rotor being driven by said output shaft through said gear train and said clutch, directional reference means for providing a signal representative of the heading of said craft, said first stator being responsive to said heading signal, the output of said first rotor being connected through a first switch means to the input of said amplifier when said first switch is in a first condition, a bank integrating means, the output of said first rotor being connected to said bank integrating means through a second switch means when said second switch is in a first condition, said bank integrating means providing a signal representative of a smoothed version of said heading signal, said second stator providing a signal representative of a filtered version of said heading signal, roll reference means for providing a signal representative of the roll attitude of said craft, and aileron servo means responsive to said roll attitude, smoothed heading, and filtered heading signals for positioning said ailerons in accordance with the algebraic summation thereof.

12. A combination as claimed in claim 11 including a rudder, and rudder servo means connected to said first rotor when said second switch is in its first condition for positioning said rudder in accordance with the output of said first rotor.

13. A combination as claimed in claim 11 including means including radio receiving means for providing a signal representative of the lateral displacement of said craft from a radio defined course, said first switch being in its second condition disconnecting said heading signal from the input of said amplifier and connecting said radio displacement signal to the input of said amplifier, third switch means for selectively connecting the output of said first rotor to said bank integrator when said third switch is in its first condition, and means for deenergizing said clutch thereby disconnecting said second rotor from said output shaft when said third switch is in its first condition.

14. A combination as claimed in claim 13 including a rate circuit responsive to said radio displacement signal for providing a signal in accordance with the rate of change of said displacement signal, and fourth switch means connecting said rate circuit to said bank integrator when said fourth switch is in its first condition, said third switch being in its second condition disconnecting said first rotor from said bank integrator, said clutch being energized to connect said second rotor to said output shaft when said fourth switch is in its first condition, said aileron servo means being connected to said bank integrator and said second stator for positioning said aileron in accordance with the algebraic summation of the signals therefrom.

References Cited in the file of this patent

UNITED STATES PATENTS

| | | |
|---|---|---|
| 2,472,129 | Streeter | June 7, 1949 |
| 2,567,922 | Brannin et al. | Sept. 18, 1951 |
| 2,672,334 | Chenery | Mar. 16, 1954 |
| 2,759,689 | Owen | Aug. 21, 1956 |
| 2,764,719 | Woodson | Sept. 25, 1956 |
| 2,808,999 | Chenery | Oct. 8, 1957 |
| 2,827,249 | Glaus | Mar. 18, 1958 |
| 2,832,552 | Schuck | Apr. 29, 1958 |
| 2,834,562 | Jude et al. | May 13, 1958 |
| 2,881,992 | Hecht et al. | Apr. 14, 1959 |
| 2,945,647 | Bell | July 19, 1960 |